US012434967B2

(12) United States Patent
Torre et al.

(10) Patent No.: US 12,434,967 B2
(45) Date of Patent: Oct. 7, 2025

(54) METHOD FOR PREPARING A SOLID MATERIAL FOR STORING OZONE, THE MATERIAL AND THE USES THEREOF

(71) Applicants: INSTITUT NATIONAL POLYTECHNIQUE DE TOULOUSE, Toulouse (FR); ECOLE D'INGENIEURS DE PURPAN, Toulouse (FR); UNIVERSITE PAUL SABATIER (TOULOUSE III), Toulouse (FR); CENTRE NATIONAL DE LA RECHERCHE SCIENTIFIQUE, Paris (FR); INSTITUT NATIONAL DE RECHERCHE POUR L'AGRICULTURE, L'ALIMENTATION ET L'ENVIRONNEMENT, Paris (FR)

(72) Inventors: Jean-Philippe Torre, Toulouse (FR); Marielle Pages-Homs, Toulouse (FR); Frédéric Violleau, Toulouse (FR); Marie-Hélène Manero, Toulouse (FR); Romain Richard, Toulouse (FR)

(73) Assignees: INSTITUT NATIONAL POLYTECHNIQUE DE TOULOUSE, Toulouse (FR); ECOLE D'INGENIEURS DE PURPAN, Toulouse (FR); UNIVERSITE PAUL SABATIER (TOULOUSE III), Toulouse (FR); CENTRE NATIONAL DE LA RECHERCHE SCIENTIFIQUE, Paris (FR); INSTITUT NATIONAL DE RECHERCHE POUR L'AGRICULTURE, L'ALIMENTATION ET L'ENVIRONNEMENT, Paris (FR)

( * ) Notice: Subject to any disclaimer, the term of this patent is extended or adjusted under 35 U.S.C. 154(b) by 1026 days.

(21) Appl. No.: 17/422,709
(22) PCT Filed: Jan. 14, 2020
(86) PCT No.: PCT/FR2020/050038
§ 371 (c)(1),
(2) Date: Jul. 13, 2021
(87) PCT Pub. No.: WO2020/148497
PCT Pub. Date: Jul. 23, 2020

(65) Prior Publication Data
US 2022/0267148 A1    Aug. 25, 2022

(30) Foreign Application Priority Data
Jan. 14, 2019   (FR) ...................................... 1900325

(51) Int. Cl.
*C01B 13/10*      (2006.01)
*A01N 25/10*      (2006.01)
(Continued)

(52) U.S. Cl.
CPC .............. *C01B 13/10* (2013.01); *A01N 25/10* (2013.01); *A01N 59/00* (2013.01); *A01P 1/00* (2021.08);
(Continued)

(58) Field of Classification Search
CPC ......... C01B 13/10; C01B 13/00; A01N 25/10; A01N 59/00; A01P 1/00; A61K 33/00;
(Continued)

(56) References Cited

U.S. PATENT DOCUMENTS

| | | | | |
|---|---|---|---|---|
| 2009/0292155 | A1* | 11/2009 | Ball | B09C 1/002 588/320 |
| 2016/0367967 | A1* | 12/2016 | Suri | C02F 1/288 |
| 2018/0178263 | A1* | 6/2018 | Ball | B01J 20/24 |

FOREIGN PATENT DOCUMENTS

| | | |
|---|---|---|
| JP | 2007-210881 A | 8/2007 |
| WO | WO 2006/134299 | 12/2006 |

OTHER PUBLICATIONS

Dettmer et al. "Stabilization and prolonged reactivity of aqueous-phase ozone with cyclodextrin." Journal of Contaminant Hydrology 196 (2017) 1-9. (Year: 2017).*
(Continued)

*Primary Examiner* — Anthony J Zimmer
*Assistant Examiner* — Syed T Iqbal
(74) *Attorney, Agent, or Firm* — Alston & Bird LLP

(57) ABSTRACT

The present invention relates to a method and a unit for preparing a solid material for storing ozone, said method comprising contacting cyclodextrins and/or derivatives of
(Continued)

cyclodextrins in solid form with a gas comprising ozone, by means of which a solid material for storing ozone is obtained. The present invention also relates to the material thus prepared and to the uses thereof.

6 Claims, 6 Drawing Sheets

(51) Int. Cl.
　　　*A01N 59/00*　　　(2006.01)
　　　*A01P 1/00*　　　(2006.01)
　　　*A61K 33/00*　　　(2006.01)
　　　*A61K 47/69*　　　(2017.01)
　　　*A61L 2/20*　　　(2006.01)
　　　*A61L 9/04*　　　(2006.01)
　　　*A61L 101/02*　　　(2006.01)
　　　*B01J 20/24*　　　(2006.01)
　　　*C02F 1/50*　　　(2023.01)
　　　*C02F 1/78*　　　(2023.01)

(52) U.S. Cl.
　　　CPC .......... *A61K 33/00* (2013.01); *A61K 47/6951* (2017.08); *A61L 2/202* (2013.01); *A61L 9/042* (2013.01); *B01J 20/24* (2013.01); *C02F 1/50* (2013.01); *C02F 1/78* (2013.01); *A61L 2101/02* (2020.08); *A61L 2202/25* (2013.01); *C02F 2303/04* (2013.01)

(58) Field of Classification Search
　　　CPC ..... A61K 47/6951; A61L 2/202; A61L 9/042; A61L 2101/02; A61L 2202/25; B01J 20/24; C02F 1/50; C02F 1/78; C02F 2303/04; C02F 1/286; C02F 2201/782; C02F 2303/16; C08L 5/16; C08B 37/0015
　　　See application file for complete search history.

(56) References Cited

OTHER PUBLICATIONS

Dettmer, Adam, et al., "Stabilization and prolonged reactivity of aqueous-phase ozone with clyclodextrin," Contominant Hydrology, 196:1-9 (2017).
Mcturk, G et al., "Ozone-Carbon Tetrachloride Double Hydrate," Nature, 202(4937): 1107, (Jun. 13, 1964).
Nakajima, Takahiro, et al., "Molecular Storage of Ozone in a Clathrate Hydrate: An Attempt at Preserving Ozone at High Concentrations," PloSOne, 7(11)e48563:1-6, (Nov. 2012).
French Application No. 1900325, Preliminary French Search Report mailed Oct. 28, 2019.
WIPO Application No. PCT/FR2020/050038, PCT International Search Report mailed 05-26- 2020.

\* cited by examiner

METHOD FOR PREPARING A SOLID MATERIAL FOR STORING OZONE, THE MATERIAL AND THE USES THEREOF

CROSS REFERENCE TO RELATED APPLICATIONS

This application is a national stage entry of PCT/FR2020/050038 filed Jan. 14, 2020, which claims the benefit of FR Application No. 1900325 filed Jan. 14, 2019, which is hereby incorporated by reference.

TECHNICAL FIELD

The present invention relates to the general technical field of ozone storage.

More particularly, the present invention provides a process and a facility for preparing a material in solid form and, hence, easily handled, in which ozone is stored.

The present invention also relates to this ozone storage material, which increases stability of ozone and thus its lifetime, and to the use of this material in all applications aiming at exploiting properties of ozone.

STATE OF PRIOR ART

Due to its high oxidising power, ozone is currently used for many applications, such as water disinfection and treatment. The use of ozone is also being carefully considered for potential applications such as plant treatment.

Nevertheless, even though some commercial sites advertise this treatment possibility, the application of ozone-enriched water in an open environment is of low relevance. Indeed, the droplet of enriched water found in an atmosphere completely devoid of ozone will be at the heart of a desorption phenomenon: ozone will leave the water droplet very soon and will not reach its target (the leaf if a plant is treated).

Moreover, ozone is a gas under ambient conditions that cannot be stored due to its instability. Thus, this molecule should be produced as needed by an ozoniser, also called "ozone generator", which produces an electric discharge in a stream of dioxygen ($O_2$) and allows creation of the ozone ($O_3$) molecule. Ozone can also be produced by other processes involving plasma or UV light especially at the wavelength of 185 nm. This ozone molecule has a limited lifetime of about 20 minutes in water under ambient conditions. It cannot be stored, for example, in a bottle in its pure state or in a mixture. It should be noted that explosion risks are high when the mixture contemplated is a mixture of dioxygen and ozone in which the ozone concentration is greater than 10-13 mol % and/or when this mixture is compressed to a pressure in the order of several tens of bars. The lifetime of the ozone can be extended, for example by strongly lowering the temperature (for example liquid nitrogen), but there is currently no system that can store a large amount of ozone for a long time.

This storage limitation raises problems for the easy use of this gas, as an ozoniser is required on site and, if so, the gas produced should be used immediately. Furthermore, depending on the target applications, the need for an on-site ozoniser can be considered too expensive, too cumbersome or even too technical.

The very short lifetime of ozone is linked to the fact that the ozone molecule is unstable: when two ozone molecules meet, they can decompose into three oxygen molecules according to the reaction $2\,O_3 \rightarrow 3\,O_2$. This decomposition is promoted by temperature and the presence of catalytic elements such as some solid materials, some molecules or some humidity conditions. For example, the half-life of ozone in air is theoretically 3 days, but as this gas reacts with almost all surrounding materials, it is in practice a few seconds. It is therefore very difficult to limit the decomposition reaction of ozone, except at very low temperatures where the movement of molecules is reduced. Moreover, pressurisation of ozone leads to an increase in its instability (bringing the molecules together) and therefore to a reduction in its lifetime.

Several strategies have already been provided to solve the technical problem of ozone storage.

Research carried out in the 1960s suggested a theoretical way of storing liquid ozone by stabilising it with fluorine, chlorine trifluoride and nitric acid, but this research was not pursued, probably because of the dangerous nature of these products. The storage of liquid $O_2/O_3$ mixtures under high pressure has also been contemplated and tested but never marketed as it is extremely dangerous. Indeed, there are explosion risks if the percentage of liquid ozone is too high and/or if dioxygen evaporates and creates an explosive atmosphere. Moreover, ozone thermal decomposition risks added to the decomposition risks in contact with solids or molecules have led the research teams involved to abandon these themes.

The Air Liquide company has for some time marketed a safer liquid ozone storage in cryogenic liquid (Freon). But the difficulty of separating the two gases and the problems of ozone decomposition put an end to the marketing of this product.

The ozone storage in a gas hydrate has also been suggested. This concept was first demonstrated in 1964 by McTurk and Waller who succeeded in forming a mixed tetrachloromethane ($CCl_4$)+$O_3$ hydrate by saturating a $CCl_4$ solution with ozone at −2° C. However, $CCl_4$ is an extremely toxic product that cannot be used in many applications using ozone as an oxidant or disinfectant [1]. Mixed hydrates containing ozone formed by contacting an $O_2/O_3$ mixture and a help gas were studied mainly by a Japanese team (Ohmura and Mori) between 2010 and 2014. Among works published by this team, mention can be made of Nakagima et al, 2012 which studies the phase equilibrium and composition of the mixed $O_2/O_3+CO_2$ hydrate [2]. It was shown in this work that an $O_2/O_3$ mixture containing 10-12 mol % $O_3$ mixed with $CO_2$ in a 1:7 molar ratio formed at the pressure of 19 bar and a temperature of 0.1° C. is stable under aerated conditions (tube open to air) for more than 20 days at −25° C. and can store an amount of ozone of 0.1 mass %.

At present, ozonated water and ozonated ice can be used. For example, patent application JP 2007/210881 on behalf of Kurita Water Ind. Ltd. published on 23 Aug. 2007 [3] provides a process for preparing ozonated ice. But the ozone concentration in ozonated water and ozonated ice is very low and the lifetime is short.

In order to increase the lifetime of ozone in ozonated water and to achieve extended reactivity, it has been suggested to trap, in the aqueous phase, ozone in a cyclodextrin of the hydroxypropyl-β-cyclodextrin type [4]. Similarly, patent application US 2018/0178263 on behalf of OXYTEC LLC, published on 28 Jun. 2018 [5] provides a process for reducing contamination in water or soil, consisting in injecting an aqueous solution of an ozone clathrate using a cyclic oligosaccharide such as a cyclodextrin. In these documents, the cyclodextrin is always dissolved in water and then ozone in gaseous form is injected into this solution.

In a separate aspect of ozone storage, patent application US 2016/0367967 on behalf of Temple University of the Commonwealth System of Higher Education, published on 22 December 2016 [6] relates to systems and processes for regenerating a β-cyclodextrin type adsorbent after its use in a water decontamination process. The regeneration process is based on treating the β-cyclodextrin with ozone gas used to destroy contaminants trapped in the β-cyclodextrin cavity. The adsorbent β-cyclodextrin used can be regenerated and reused for many treatment cycles by virtue of this liquid phase ozonation process.

The inventors have set the objective of developing a material that is easy to prepare, easy to use and able to store ozone in large amounts and for a long time so as to remove a number of obstacles to the practical use of this gas.

DISCLOSURE OF THE INVENTION

The present invention makes it possible to achieve the objective set by the inventors and to solve all or part of the drawbacks of the processes and materials for storing ozone in the state of the art.

Indeed, the inventors have developed a process making it possible to produce an ozone storage material in solid form and therefore easily handled and used. The preparation process according to the invention makes it possible to obtain a powder which can be used as it is by sprinkling, in the form of a solution, dispersion, emulsion or suspension by spraying, or even in a more compacted form especially to make tablets.

Moreover, the solid storage material prepared in accordance with the process according to the invention makes it possible to store ozone for a long time, since the non-optimized tests carried out by the inventors have shown that ozone can be stored therein over several days at ambient temperature, which corresponds to a significant improvement with respect to the half-life of ozone at ambient temperature, which is in the order of about twenty minutes in ozonated water. It is therefore not only an ozone storage material but also an ozone stabilisation material. This material also has a high potential ozone storage capacity. Some of the materials described in the following experimental section have a storage capacity 400 times higher than ozonated water and even 800 times higher than ozonated water.

The fact that the solid storage material prepared in accordance with the process according to the invention is easy to handle while ensuring long-term stabilisation of the ozone makes it possible to separate the place of production from the place of use and even to contemplate a storage place separate from the place of production and the place of use. The ozone storage material according to the invention is therefore also an ozone transport material.

All these advantages are obtained by implementing a simple process that can be easily industrialised, does not require risky operating conditions and uses raw materials of the cyclodextrin or cyclodextrin derivative type that are easily accessible and relatively inexpensive. Indeed, cyclodextrins, already widely used in cosmetic and pharmaceutical formulations, are a natural, non-hazardous, sugar-based, eco-compatible product that degrades in the natural environment. The use of cyclodextrin derivatives that may have different properties, especially in terms of solubility, hydrophilicity, hydrophobicity, complexation properties, etc., makes it possible to contemplate the preparation of a modular and versatile solid ozone storage material adapted to targeted uses. Another interesting fact is that the presence of cyclodextrins or cyclodextrin derivatives can make it possible to obtain a solid ozone storage material that sinks in water and releases ozone into the fluid, because the density of the cyclodextrins or cyclodextrin derivatives is greater than that of water. This is an additional advantage if, for example, the powder is packaged in pellet form.

More particularly, the present invention relates to a process for preparing a solid ozone storage material comprising contacting cyclodextrins and/or cyclodextrin derivatives in solid form with a gas comprising ozone whereby a solid ozone storage material is obtained.

By "cyclodextrin", it is meant a cyclic oligosaccharide of the formula $(C_6H_{10}O_5)_n$, composed of n α-(1,4)-linked glucopyranose subunits of the formula $C_6H_{10}O_5$ with n representing an integer. The terms "cyclodextrin", "cycloamylose", "cycloglucan", "cyclomaltooside" and "Schardinger dextrin" are equivalent and can be used interchangeably.

Cyclodextrins implemented within the scope of the invention have an annular structure, forming a truncated cone-shaped cage delimiting a cavity the size of which is dependent on the number n of glucopyranose subunits and which can stabilise other molecules, where n is advantageously between 6 and 35.

By way of particular examples of cyclodextrins usable within the scope of the invention, mention can be made of cyclomaltohexaoses, cyclohexaamyloses, α-cycloamylases or α-cyclodextrins (α-CDs) in which n represents 6, cyclomaltoheptaoses or β-cyclodextrins (β-CDs) in which n represents 7 and cyclomaltooctaoses or γ-cyclodextrins (γ-CDs) in which n represents 8, cyclomaltononaoses in which n is 9, cyclomaltoheneicosaoses in which n is 21, cyclomaltodoicosaoses in which n is 22 and cyclomaltohentricontaoses in which n is 31.

By "cyclodextrin derivative", it is meant a cyclodextrin as defined above, which is chemically modified, cross-linked, immobilised and/or organised in a molecular superstructure. Whatever the alternative contemplated, a cyclodextrin derivative implemented in the invention always has a cavity capable of stabilising other molecules.

A chemically modified cyclodextrin derivative is obtained by substituting at least one hydrogen atom and/or at least one hydroxyl radical of a cyclodextrin as previously defined with an atom or chemical group such as a halogen atom, an alkyl group, a hydroxyalkyl group, a thioalkyl group, a sulfhydryl group, an acetyl group, a silyl group, an acyl group, a sulphonyl group, an amine group, a sulphoalkylether group, a sulphate group, a phosphate group, a carboxyl group, a carboxylester group, a quaternary ammonium group, a glucosyl group, a maltosyl group, a chlorotriazinyl group or a quaternary ammonium group. Depending on the chemical nature of the substituent group(s) implemented, the cyclodextrin derivative may be ionic or amphiphilic.

By way of illustrative and non-limiting examples of chemically modified cyclodextrin type derivatives, mention can be made of a randomly methylated α-CD, β-CD or γ-CD; a methyl-α-CD; a methyl-β-CD; methyl-γ-CD; a heptakis(2,3,6-tri-O-methyl)-β-CD; an α-CD, β-CD or γ-CD weakly methylated in the 2-position (2-O-methylated); a dimethylated α-CD, β-CD or γ-CD; a permethylated α-CD, β-CD or γ-CD; a perpentylated α-CD, β-CD or γ-CD; an acetylated α-CD, β-CD or γ-CD; a peracetylated α-CD, β-CD or γ-CD; a hydroxypropylated α-CD, β-CD or γ-CD; a hydroxyethylated α-CD, β-CD or γ-CD; a sulphated α-CD, β-CD or γ-CD; a phosphated α-CD, β-CD or γ-CD; a carboxymethylated α-CD, β-CD or γ-CD; a carboxymethylether α-CD, β-CD or γ-CD; a 3-trimethylammonium- 2-hydroxypropyl-ether-α-CD; a 3-trimethylammonium-2-hydroxypropyl-ether-β-CD; a 3-trimethylammonium-2-hydroxypropyl-ether-γ-CD; mono-(6-mercapto-6-deoxy)-β-CD; mono-(6-amino-6-deoxy)-β-CD; heptakis(6-amino-6-deoxy)-β-CD; mono-(6-(diethylenetriamine)-6-deoxy)-β-CD; hexakis-(6-iodo-6-deoxy)-α-CD; sulfobutylether-α-CD; sulfobutylether-β-CD; sulfobutylether-γ-CD; 3-trimethylammonium-2-hydroxylpropylether-α-CD; 3-trimethylammonium-2-hydroxylpropylether-β-CD; 3-trimethylammonium-2-hydroxylpropylether-γ-CD; glucosyl-α-CD; glucosyl-β-CD; glucosyl-γ-CD; maltosyl-α-CD; maltosyl-β-CD; maltosyl-γ-CD; chlorotriazinyl-α-CD; chlorotriazinyl-β-CD; and chlorotriazinyl-γ-CD.

A cross-linked cyclodextrin type derivative is typically obtained by forming bonds between cyclodextrins or chemically modified cyclodextrins as previously defined by virtue of a cross-linking agent such as epichlorohydrin, 1,4-butanedioldiglycidylether, 1,2-epoxypropane, 1,3-diglycidylglycerol, 1,4-phenyldiisocyanate, 2,4-toluene diisocyanate, glutaraldehyde or citric acid. A cross-linked cyclodextrin type derivative is in the form of a soluble or insoluble polymer such as cross-linked gels or hydrogels. Thus, cyclodextrin polymers are examples of cross-linked cyclodextrin derivatives. This type of derivative can be prepared in two steps with, firstly, cross-linking the CD molecules with epichlorohydrin in the presence of another cationic cross-linking agent and then carboxymethylating the cross-linked particles on the surface. By way of particular example, one can cite an amphoteric gel of cyclodextrins cross-linked with epichlorohydrin in the presence of 3-chloro-2-hydroxypropyl trimethylammonium, and carboxymethylated [7].

An immobilised cyclodextrin type derivative corresponds to cyclodextrins or chemically modified cyclodextrins as previously defined, grafted onto polymers such as polyalkylamines, polyethylene imines, polyallylamines or polyacrylates; onto membranes such as supported liquid membranes or dense membranes; onto textiles; onto inorganic beads such as silica beads or activated carbon beads; or onto organic resins.

By way of illustrative and non-limiting examples of immobilised cyclodextrin derivatives, mention can be made of poly(vinyl acetate)-β-CD membranes cross-linked with diepoxide, mixed polysiloxane-β-CD membranes on ceramic membranes, poly(vinyl acetate)-α-CD membranes cross-linked with hexamethylene diisocyantate, β-CDs bound to polyacrilonitrile or polyester fibres, CDs grafted onto chitosan, monochlorotriazinyl-β-CDs bound to cotton, cotton/polyurethane or cotton/polyamide fibres, and wool, cellulose or polyethylene terephthalate fibres treated with the β-CD/1,2,3,4-butanetetracarboxylic acid system.

By way of examples of cyclodextrin type derivatives organised in a molecular superstructure, mention can be made of polyrotaxanes, polypseudorotaxanes consisting of a poly(ethylene glycol) chain making up the stator complexed with several cyclodextrins making up the moving part or rotor and molecular tubes.

The process according to the present invention contemplates the implementation of (i) a set of identical or different cyclodextrins, (ii) a set of identical or different cyclodextrin derivatives or (iii) a set of identical or different cyclodextrins and identical or different cyclodextrin derivatives.

Advantageously, cyclodextrins and/or cyclodextrin derivatives implemented in the present invention are selected from the group consisting of α-CDs, β-CDs, γ-CDs, hydroxypropylated α-CDs, hydroxypropylated β-CDs, hydroxypropylated γ-CDs, dimethylated α-CDs, dimethylated β-CDs, dimethylated γ-CDs; sulfobutylether-α-CDs, sulfobutylether-β-CDs, sulfobutylether-γ-CDs, sulfated α-CDs, sulfated β-CDs, sulfated γ-CDs, phosphated α-CDs, phosphated β-CDs, phosphated γ-CDs; carboxymethylated α-CDs, carboxymethylated β-CDs, carboxymethylated γ-CDs, carboxymethylether α-CDs, carboxymethylether β-CDs, carboxymethylether γ-CDs, 3-trimethylammonium-2-hydroxypropyl-ether-α-CDs; 3-trimethylammonium-2-hydroxypropyl-ether-β-CDs; 3-trimethylammonium-2-hydroxypropyl-ether-γ-CDs; cross-linked cyclodextrin derivatives and mixtures thereof.

Cyclodextrins and/or cyclodextrin derivatives implemented within the scope of the invention are in solid form and especially in powder form. The particle size of this powder depends on the type of cyclodextrins and/or cyclodextrin derivatives implemented. Typically, the mean grain diameter of the cyclodextrin and/or cyclodextrin derivative powder is between 10 nm and 10 mm and especially between 10 μm and 5 mm.

Cyclodextrins and/or cyclodextrin derivatives implemented within the scope of the invention can also be in compact solid form, especially in the form of a solid block or an assembly of several solid blocks.

In their native state, that is either after their natural production or after their chemical synthesis, the solid cyclodextrins and/or cyclodextrin derivatives implemented within the scope of the invention are stabilised by one or more water molecules present especially in their cavity. Advantageously, when contacted with the ozone-comprising gas, cyclodextrins and/or cyclodextrin derivatives implemented within the scope of the invention are free of any molecule different from a water molecule and capable of reacting with ozone.

Furthermore, the process according to the present invention may have a step prior to contacting the cyclodextrins and/or cyclodextrin derivatives with the gas comprising ozone aiming at removing all or part of water molecules associated with the cyclodextrins and/or cyclodextrin derivatives. By way of example, such a treatment can be a thermal treatment or a vacuum extraction. Alternatively, the process according to the present invention may have a step prior to contacting the cyclodextrins and/or cyclodextrin derivatives with the gas comprising ozone aiming at replacing all or part of water molecules present in the cavities of the cyclodextrins and/or cyclodextrin derivatives with a non-ozone reactive substance, such as carbon dioxide. By way of examples, such a treatment may consist in contacting the cyclodextrins and/or cyclodextrin derivatives with $CO_2$ under pressure.

Advantageously, the gas comprising ozone implemented within the scope of the invention is a gas mixture comprising ozone and at least one other gas such as dioxygen, carbon dioxide, nitrogen or a mixture thereof. When the gas mixture comprises ozone and dioxygen, this mixture is produced from an ozone generator or ozoniser, typically supplied with ambient air, dry air, humid air, compressed air or pure oxygen. The ozone concentration in the gas mixture at the outlet of the ozone generator is between 10 g/Nm$^3$ and 180 g/Nm$^3$. The production of ozone in such an ozone generator or ozoniser can involve electric discharge, plasma or UV light especially at the wavelength of 185 nm.

Typically, in the process according to the invention, contacting cyclodextrins and/or cyclodextrin derivatives with the gas comprising ozone is carried out at a temperature of between 0° C. and 80° C., especially between 5° C. and 70° C., in particular between 10° C. and 60° C., more particularly between 15° C. and 55° C. and even more particularly between 15° C. and 40° C. Thus, this contacting can be carried out at ambient temperature. By "ambient temperature", it is meant any temperature between 18° C. and 28° C. Alternatively, this contacting can be carried out at 50° C.

Typically, in the process according to the invention, contacting cyclodextrins and/or cyclodextrin derivatives with the gas comprising ozone lasts between 1 min and 8 h, especially between 15 min and 6 h and, in particular, between 30 min and 4 h. More particularly, this contacting can last, for example, in the order of 1 h (that is 1 h±15 min), in the order of 2 h (that is 2 h±15 min) or in the order of 3 h (that is 3 h±15 min).

In the process according to the invention, contacting cyclodextrins and/or cyclodextrin derivatives with the gas comprising ozone can be carried out in any system allowing a so-called "gas/solid" reaction, that is in an apparatus or device allowing effective contacting between a gas and a solid. Considering the solid phase corresponding, in the process according to the invention, to cyclodextrins and/or cyclodextrin derivatives in solid form, contacting can be in a batch, semi-batch or continuous form.

In a batch process, the solid is loaded into a gas/solid contactor, operating in a fixed or fluidised bed.

In a semi-batch process, several contactors operate simultaneously in either a fixed or fluidised bed. By means of a set of valves, it is possible to load or unload an apparatus in which the reaction is complete while another is reacting. In this way a continuous process can be simulated.

In a continuous fluidised process, the solid can be expanded in the contactor or may flow countercurrently to the reactant gas stream. The reaction takes place when the gas meets the moving or non-moving solid particles. There can be moving beds, or multi-stage fluidised beds with recirculation of the solid between stages.

In a fixed bed, the solid particles are placed in a reactor with a porous bottom (called a "distributor") capable of letting the ozone-containing gas pass through the bottom from bottom to top while retaining particles placed above this bottom. The bed is said to be "fixed" because it does not move (the solids remain stationary), the gas flowing through the interstitial space left free between the fixed particles. In this case, the gas flow rate is deliberately low so as not to move the particles.

In a fluidised bed, the gas flow rate used is higher than in a fixed bed process. The gas velocity between the solid particles increases, and as a result the gas friction on the particle surface also increases. When the gas friction creates a force sufficient to compensate for the weight of all the particles in the bed, the particle bed is said to be fluidised. The gas velocity at which the bed is fluidised is called the "minimum fluidisation velocity". Once this transition from the state of fixed bed to fluidised bed has been achieved by maintaining the gas flow at the appropriate rate, the fluidised particle layer behaves like a liquid where, for example, lighter objects can float on its surface and heavier objects can sink.

In a moving bed, the gas flow rate used is even higher than that used previously. Thus, the particles can move away from each other leaving more free space between them and gas bubbles can appear. Solid particles can be entrained by the gas and leave the reactor. The solution contemplated is usually placing a cyclone after the reactor, which separates the gas and the solid particles by centrifugal force. The solid can then be collected and reinjected into the bottom of the reactor until the desired reaction time is reached.

In the process according to the invention, contacting cyclodextrins and/or cyclodextrin derivatives with the gas comprising ozone can also be carried out in contactors such as powder mixers or stirred reactors. These mixers can be grouped into several categories: rotating vessels (closed rotated chambers), convective mixers (consisting of a fixed vessel or chamber and a moving mechanical part (stirrer, ribbon) inside this vessel), high shear mixers (static vessel in which a stirrer rotates at high speed), static mixers (circulation of the powder in a chamber containing internals), fluidised bed mixers (circulation of a gas within the bed of powder allowing it to be moved within the apparatus), and apparatuses consisting of a combination of several mixers. These apparatuses can operate in continuous or batch mode. Examples of batch mixers include conical screw, paddle, ribbon screw, ploughshare, paddle, vertical, hybrid birotor, etc. Examples of continuous mixers are high-impact, modular, or fast paddle mixers.

As explained above, the person skilled in the art will be able to adapt, without any inventive effort, the flow rate of the gas upon contacting cyclodextrins and/or cyclodextrin derivatives in solid form with the gas comprising ozone based on the devices or facilities chosen for this contacting. Typically, the gas flow rate at the outlet of the gas source comprising ozone and especially at the outlet of the ozoniser is between 15 L/h and 1 m$^3$/h.

Similarly, the person skilled in the art will be able to choose, without any inventive effort, the amount of cyclodextrins and/or cyclodextrin derivatives in solid form to be used based on the devices or facilities chosen for this contacting.

The process according to the present invention can comprise an additional step consisting in recovering the cyclodextrins and/or cyclodextrin derivatives subsequently to contacting them with the ozone-comprising gas. This recovery can in of discharging the cyclodextrins and/or cyclodextrin derivatives from the reactor as previously defined in which contacting took place.

The obtained or recovered material at the end of the process according to the invention has the same visual appearance as the cyclodextrins and/or cyclodextrin derivatives implemented in the process. It is therefore in powder form, the mean diameter of the grains of which is typically between 10 nm and 10 mm and especially between 10 μm and 5 mm, or in compact solid form.

On the other hand, the obtained or recovered material is chemically different from the starting material corresponding to the cyclodextrins and/or cyclodextrin derivatives used during the process, that is the cyclodextrins and/or cyclodextrin derivatives that have not been contacted with the gas containing ozone. Indeed, the obtained or recovered material is positive to the test from potassium iodide/thiosulphate assay, unlike the starting material. The resulting or recovered material also has clear oxidising and biocidal properties, which the starting material does not have. Furthermore, the obtained or recovered material releases ozone when tested with an ozone detector in a closed container. Indeed, the ozone concentration increases over time in the container containing this obtained or recovered material, whereas no ozone release is observed with the starting material.

This, together with the fact that the obtained or recovered material loses some of its oxidising activity over time, is evidence that the obtained or recovered material contains ozone. In other words, subsequently to contacting them with a gas containing ozone, at least some of the cavities of the cyclodextrins and/or cyclodextrin derivatives in solid form contain ozone, which may be in molecular, ionic and/or radical form. The obtained or recovered material is therefore a solid ozone storage material.

By "ozone storage", it is intended, within the scope of the invention, a physical and/or chemical ozone storage. A physical ozone storage is a storage without chemical modification of ozone such as dissolution, adsorption, complexation, etc. A chemical ozone storage is a storage involving a chemical reaction, such as a chemical reaction between ozone and cyclodextrins and/or cyclodextrin derivatives. Thus, subsequently to contacting them with a gas comprising ozone, cyclodextrins and/or cyclodextrin derivatives in solid form contain, for example, ozone (physical storage) and/or ozone (chemical storage) stabilised by reaction with the cyclodextrins and/or cyclodextrin derivatives, or possibly by reaction with water molecules and/or with other species present in the gas comprising ozone.

The present invention also relates to a facility (unit) capable of being implemented in the preparation process as previously defined. This facility comprises at least one reactor containing cyclodextrins and/or cyclodextrin derivatives in solid form as previously defined in fluid connection with a source of a gas comprising ozone.

The reactor of the facility according to the invention is especially a gas/solid contactor, operating in a fixed or fluidised bed, a powder mixer or a stirred reactor, in all the alternatives described above.

When the gas comprising ozone is a mixture comprising oxygen and ozone, the source is an ozone generator. Here again, all the information previously provided to characterise such an ozone generator also applies to the facility according to the invention.

Advantageously, the facility according to the invention further comprises one or more element(s) selected from the group consisting of a filter, an ozone scavenger, a flow meter, temperature probes, ozone analysers and valves. In particular, the facility according to the invention comprises all these elements. The following experimental section describes one particular implementation of a facility according to the present invention.

The present invention also relates to a solid ozone storage material capable of being prepared by a preparation process as previously defined. Typically, the solid ozone storage material of the present invention comprises cyclodextrins and/or cyclodextrin derivatives in solid form, at least some of the cavities of which contain ozone. In one particular implementation, the solid ozone storage material subject of the present invention consists of cyclodextrins and/or cyclodextrin derivatives in solid form, at least part of the cavities of which contain ozone.

Everything that has been previously described in connection with cyclodextrins, cyclodextrin derivatives, the obtained or recovered material also applies to this aspect of the invention.

Advantageously, the solid ozone storage material according to the invention is in compacted form and/or in packaged form.

When the solid ozone storage material according to the invention is in compacted form, it can be in the form of granules, a tablet and/or a briquette.

When the solid ozone storage material according to the invention, whether compacted or not, is in packaged form, it is disposed in a container such as a sachet, a tube, a box, a vial, a column, a capsule or a gelatin capsule. This container can possibly be hermetically closed. This container can optionally be the reactor in which contacting took place.

Whether the solid ozone storage material according to the invention is in compacted form and/or in packaged form, it can be stored at a temperature of between −80° C. and 50° C. and especially between −80° C. and 40° C., under vacuum, under ambient air, under humid air, under dry air, under carbon dioxide, under inert gas such as argon, nitrogen or a mixture thereof.

Finally, the present invention relates to the use of a solid ozone storage material as previously defined or of a solid ozone storage material capable of being prepared by a preparation process as previously defined as a disinfectant (especially virus eliminating), depollutant, cleaner or biocide (especially fungicide, bactericide or herbicide). The activity of the solid material according to the invention as a disinfectant, depollutant, cleaner or biocide is generated by the ozone stored, in physical and/or chemical form, in this material.

In other words, the present invention relates to a process for disinfecting, depolluting or cleaning a fluid or a surface, consisting in contacting this fluid or this surface with a solid ozone storage material as previously defined or a solid ozone storage material capable of being prepared by a preparation process as previously defined.

By "disinfecting, depolluting or cleaning a fluid or a surface", it is meant within the scope of the invention decreasing the amount or activity of biological agents or chemical compounds present in the fluid or on the surface before being contacting with the solid ozone storage material according to the invention. This decrease in amount may involve removing or destructing such agents or compounds and/or transforming them into less harmful elements.

Any fluid capable of being contaminated by one or more biological agents or one or more chemical compounds can be subjected to a disinfection, depollution or cleaning process according to the present invention. By "fluid", it is meant either a gas or a liquid. In particular, such a fluid can be selected from the ambient air or gaseous atmosphere of a site such as a domestic room, a cold room or an industrial confined space; city water, river water, well water, groundwater, pond water, lake water, swimming pool water, aquarium water, cooling water from air-conditioning systems or cooling towers; a sample from a chemical reactor; domestic wastewater; a product, especially a liquid, an effluent or wastewater originating especially from intensive livestock farming or from industries or facilities in the chemical, pharmaceutical, cosmetic, agricultural, agri-food, maritime, aeronautical or space fields; or a mixture thereof. It should be noted that, when the fluid is ambient air or a gaseous atmosphere, the solid ozone storage material as previously defined or the solid ozone storage material that can be prepared by a preparation process as previously defined makes it possible to treat the latter by depolluting it, disinfecting it and/or eliminating the odours.

Any surface capable of being contaminated by one or more biological agent(s) or one or more chemical compound(s) can be subjected to a disinfection, depollution or cleaning process according to the present invention. Advantageously, within the scope of the present invention, the surface to be disinfected, depolluted or cleaned can be an inorganic surface and especially a surface made of metal such as aluminium, metal alloy, steel and especially stainless steel, tinplate, silicon, glass generally containing silicates, silica glass, ceramics, brick, porcelain, cement, concrete, asphalt, stone, granite, plastic, or any combination thereof. In particular, such a surface can be selected from large facilities such as an industrial object like an electronic device or a machine used in the food industry, a vehicle, a carcass, an aircraft, a tank, a restaurant kitchen, a cold room, a sanitary facility, a container, a part of a dwelling such as a roof, a facade, a terrace, a driveway; and small facilities such as space, ship or submarine borne systems, medical devices or pipes. It can also be an organic surface such as soil or earth, wood or a plant surface. "Plant surface" means a plant, a part of a plant such as leaves, stems, roots, fruits or seeds, or a collection of plants.

By "biological agent", it is meant natural micro-organisms such as bacteria, archaea, parasites, protozoa, fungi, yeasts or viruses, toxins produced or not by such micro-organisms, pathogens of a protein nature such as prions and genetically modified micro-organisms, as well as plants such as plants or mosses or parts of plants such as seeds, fruits, leaves, stems or roots.

In view of the above, it is clear that plants or parts of plants can in some applications be the surface to be treated. In this case, the solid ozone storage material as previously defined or the solid ozone storage material that can be prepared by a preparation process as previously defined is used to eliminate micro-organisms such as fungi or bacteria present on these plants or parts of plants. In other applications, the plants or parts of plants constitute the biological agent to be eliminated and the solid ozone storage material as previously defined or the solid ozone storage material that can be prepared by a preparation process as previously defined becomes a herbicidal agent. The person skilled in the art will be able to determine, without any inventive effort and if necessary by means of routine tests, the amount of material to be used according to the intended application.

By "chemical compound", it is meant an undesired compound such as a pollutant or contaminant that can be present or is present in a fluid or on a surface. By way of illustrative and non-limiting examples, the compound can be chosen from nitrogen dioxide ($NO_2$), carbon monoxide (CO), sulphur dioxide ($SO_2$), acrolein, a phenol, an insecticide, a pesticide, a sulphur compound such as hydrogen sulphide ($H_2S$), a thiol or a mercaptan, a saturated or unsaturated hydrocarbon such as an alkene or a polycyclic aromatic hydrocarbon, a volatile organic compound such as an aldehyde, formaldehyde, acetaldehyde, naphthalene, a primary amine, especially an aromatic one, indole, scatole, tryptophan, urobilinogen, pyrrole, benzene, ethylbenzene, toluene, a xylene, styrene, napthalene, a halogenated compound, a toxin, a carbohydrate, a peptide, a protein, a glycoprotein, a pharmaceutical compound, a pharmaceutical derivative or a mixture thereof.

Contacting the fluid or the surface with the solid ozone storage material according to the invention can be implemented in different ways, especially depending on the gaseous or liquid nature of the fluid. Thus, the solid ozone storage material can be introduced into the liquid fluid, the solid ozone storage material can be deposited or applied onto the surface, the ozone storage material can be placed in the presence of the gaseous fluid (static exposure) or the fluid, especially the gaseous fluid, can be circulated over the solid ozone storage material (dynamic exposure).

In some of these alternatives, it can be advantageous to package the solid ozone storage material according to the invention especially in the form of a column in which the material according to the invention corresponds to a fluidised bed which is fluidised by the liquid or gaseous fluid.

In the case where the solid ozone storage material according to the invention is applied to a surface, this application can be done by sprinkling the solid material or by spraying a solution, a dispersion, an emulsion, a micro-emulsion or a suspension containing the material.

In the case where the material is introduced into the liquid fluid, it can be advantageous to stir the resulting mixture.

In one particular embodiment, the process for disinfecting, depolluting or cleaning a fluid or surface according to the invention, comprises the steps of:
preparing a solid ozone storage material according to the preparation process as previously defined;
possibly recovering the solid ozone storage material thus prepared and then
contacting said fluid or surface with a solid ozone storage material thus prepared or possibly thus recovered.

In this particular embodiment, it is possible to contact the solid ozone storage material with the fluid or with the surface immediately after it is prepared or recovered. Alternatively, once prepared and before contacting, the solid ozone storage material can be preserved or stored. Typically, this preservation or storage can be carried out at a temperature between −80° C. and 50° C. and especially between −80° C. and 40° C. and this under vacuum, under ambient air, under humid air, under dry air, under carbon dioxide or under inert gas such as argon, nitrogen or a mixture thereof.

The present invention also relates to a solid ozone storage material as previously defined or a solid ozone storage material capable of being prepared by a preparation process as previously defined for use as a medicine. Indeed, due to the biocidal properties of this material, it may be contemplated to use it for the treatment or prevention of pathologies or disorders caused by a microorganism as previously defined. In particular, these pathologies or disorders are skin pathologies or troubles. Illustrative examples of such pathologies or disorders are impetigo, lymphangitis, boil, abscess, anthrax, mycosis, wart, eczema, seborrheic dermatitis, shingles and herpes. By "medicine", it is meant both a medicine for human use and a medicine for veterinary use.

The present invention also relates to the use of a solid ozone storage material as previously defined or a solid ozone storage material capable of being prepared by a preparation process as previously defined as a chemical reagent. Indeed, this material can be used as an oxidising agent during a chemical reaction and/or to provide ozone during a chemical reaction requiring it.

Further characteristics and advantages of the present invention will become apparent to the person skilled in the art upon reading the following illustrative and non-limiting examples, with reference to the appended figures.

DETAILED DISCLOSURE OF PARTICULAR EMBODIMENTS

I. Facility and Process for Preparing the Material According to the Invention

Figure 1A:
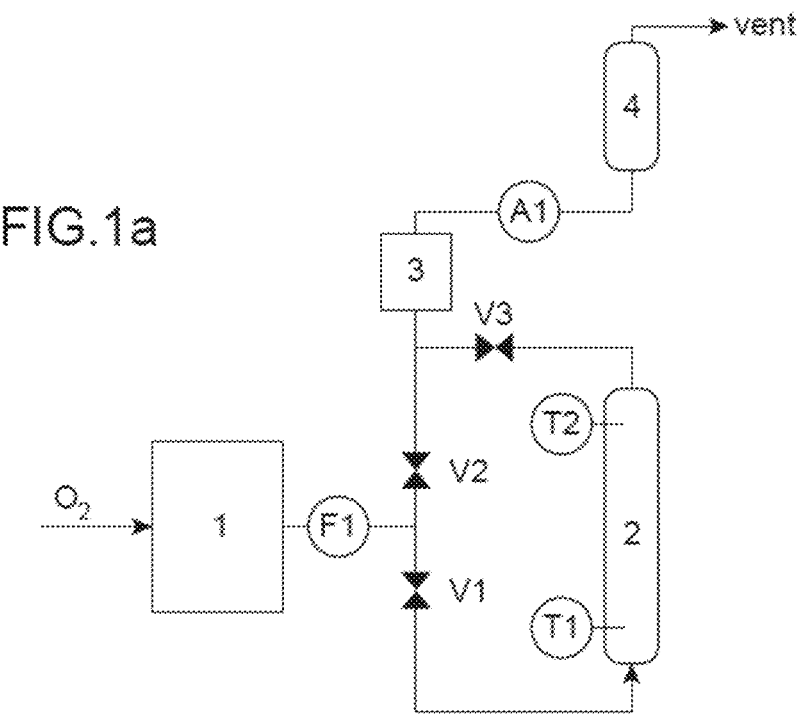
FIG. 1a shows a diagram of a facility capable of being implemented within the scope of the invention with 1. Ozoniser; 2. Reactor; 3. Filter; 4. Scavenger; F1. Flow meter; T1, T2. Temperature probes; A1. Ozone analyser; V1, V2, V3. Valves.

I.1. Example 1 of a Facility and Process for Preparing the Material According to the Invention A particular example of a facility implemented to prepare an oxidatively active material according to the invention is described in FIG. 1a.

This facility is comprised of an ozoniser (1), a reactor (2), a filter (3) and an ozone scavenger (4). The 3 valves (V1), (V2), (V3) allow the gas to be directed or not to the reactor. The process parameters are monitored using various sensors, some of which are connected to displays: a gas flow meter (ball rotameter (F1)) placed at the outlet of the ozone scavenger, a temperature probe (T1) at the inlet of the reactor, a temperature probe (T2) at the outlet of the reactor, and an ozone analyser (A1) placed between the filter and the scavenger.

The synthesis of the material of interest is done by direct gas/solid reaction between cyclodextrins and a gaseous dioxygen/ozone ($O_2/O_3$) mixture. Cyclodextrins used in the following experimental section are β-cyclodextrin (β-CD, supplied by Sigma-Aldrich, manufactured by Wacker Chemie AG, Burghausen, Germany, Life Science, batch BCBG7824V, 98, 6% pure) and (2-hydroxypropyl)-β-cyclodextrin (HP-β-CD, supplied by Sigma-Aldrich, manufactured by Wacker Chemie AG, Burghausen, Germany, Life Science, batch BCBV0722, more than 94% pure) which is much more soluble in water than β-CD. These cyclodextrins are in the form of fine-grained powder with a mean grain diameter of less than 100 μm and, in particular, of 60 μm for β-CD and 13 μm for HP-β-CD.

The reactor (2) used is comprised of a glass tube 20 cm high, 6 mm outer diameter and 1 mm thick. The tube is crimped at the ends with PTFE "double ring" fittings. The glass tube with the fittings is attached to stainless steel supports in a vertical position with a gas supply at the bottom. This reactor is positioned in an oven (Heratherm oven OGS60) to vary the temperature if necessary.

The material before reaction, for example native cyclodextrins, is initially fed into the reactor (2) manually. The solid in powder form is held in the reactor via two filters positioned upstream and downstream of the powder. The two filters used are made of cotton in the experiments and are positioned so that the powder can be fluidised by the gas supplying the reactor.

The filter (3) avoids fine particles being entrained into the scavenger.

The ozone scavenger (4) is a COD 8 type thermo-catalytic scavenger of stainless steel 316 Ti, able to instantaneously treat a maximum gas flow of 8 Nm³/h. The catalyst consists of manganese dioxide and copper oxide deposited on alumina oxide. On contact with this catalytic mass, the ozone molecules are decomposed into oxygen molecules before being released into the atmosphere (vent).

For the start-up phase, the valves are initially positioned in such a way that the gas leaving the ozoniser is directed towards the ozone scavenger: valves (V1) and (V3) closed and (V2) open.

The ozone gas is generated by an electric discharge Labo5LO type Trailigaz ozoniser, supplied with pure dioxygen ($O_2$). The ozone production is modified and controlled by adjusting voltage on the potentiometer. The gas produced at the outlet of the ozoniser is an $O_2/O_3$ mixture. The flow rate of this gas at the outlet of the ozoniser is adjusted and measured using the flow meter (F1) and the ozone concentration is measured by means of the analyser (A1).

The voltage of the ozoniser is increased until the desired ozone concentration in the gas is reached. This concentration has been set between 55 and 75 g/Nm³ for the experiments. During this transitional phase, the gas flow does not pass through the reactor.

Once the ozone concentration on the analyser (A1) and the temperatures (T1) and (T2) are stable and in accordance with the desired values (between 23 and 26° C. for the experiments), the gas leaving the ozoniser is directed to the reactor by closing the valve (V2) and opening the valves (V1) and (V3). In the experiments carried out, the gas flow rate has been set to 30 L/h with the flow meter (F1). Under these conditions, the gas flow rate (0.66 m/s) is sufficient to fluidise the material in the reactor. The passage time of the gas mixture through the reactor is then 0.3 s.

The contacting time of the powder with the ozone-containing gas has arbitrarily been set to 3 hours for these experiments.

When the desired reaction time is reached, the valves are positioned so that the gas leaving the ozoniser is directed to the scavenger. The reactor is then taken off from the support, the cotton filters are removed with tweezers and the ozone-treated powder is recovered in a glass vial.

The material obtained at the end of the synthesis is a fine white powder, resembling, to the naked eye, the material prior to the process according to the invention.

The product is stored without special precautions in vials closed with a plug. Two storage conditions have been tested: "ambient" conditions (atmospheric pressure and temperature of about 25° C.) or cold storage (atmospheric pressure and temperature of about 6° C.).

Figure 1B:
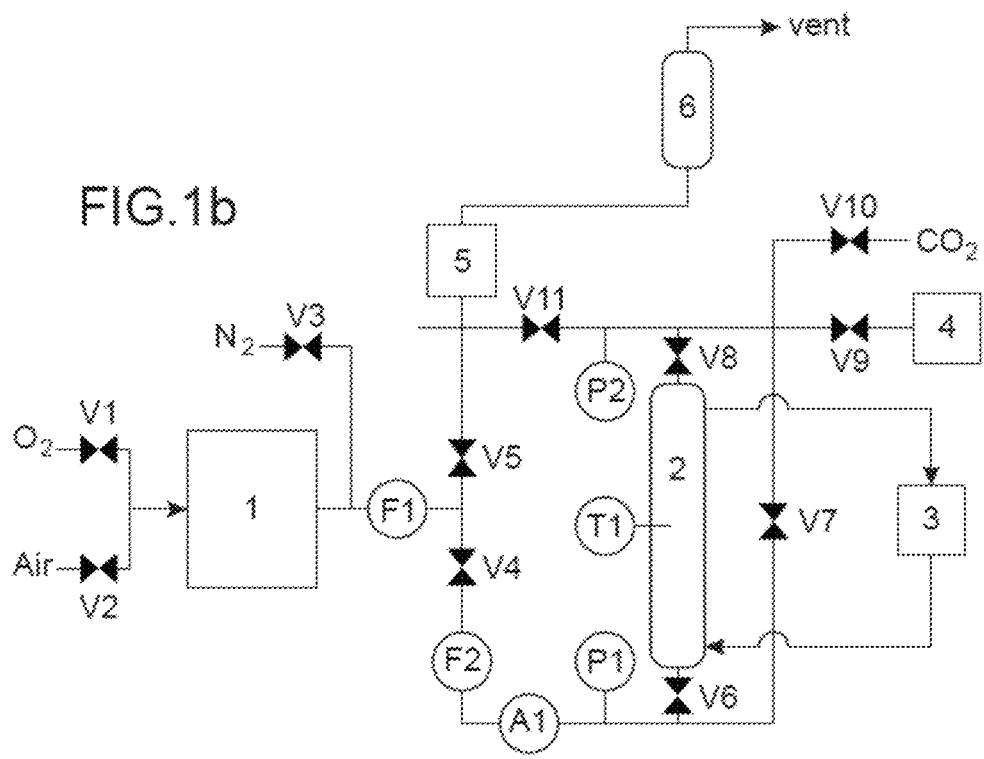
FIG. 1b shows a schematic diagram of a facility capable of being implemented within the scope of the invention with 1. Ozoniser; 2. Reactor; 3. Thermostatic bath; 4. Vacuum pump; 5. Filter; 6. Scavenger; F1, F2. Flow meters; T1. Temperature probe; P1, P2. Pressure sensors; A1. Ozone analyser; V1, V2, V3, V4, V5, V6, V7, V8, V9, V10, V11. Valves.

I.2. Example 2 of a Facility and Process for Preparing the Material According to the Invention Another particular example of a facility implemented to prepare an oxidatively active material according to the invention is described in FIG. 1b.

This facility is comprised of an ozoniser (1), a reactor (2), a thermostatic bath (3), a vacuum pump (4), a filter (5) and an ozone scavenger (6). Valves (V1) and (V2) allow the selection of the supply gas (oxygen or air) to the ozoniser. Valves (V3) and (V10) allow the circulation of nitrogen or $CO_2$ in the process, if required. Valve (V4) allows the gas coming from the ozoniser to be directed to the reactor (2). Valve (V5) directs the gas to the scavenger (5). Valves (V6) and (V8) isolate the reactor (2), and valve (V7) opens the bypass of reactor (2). Valve (V9) allows the vacuum pump (4) to be connected to the process, and valve (V11) allows the purge circuit of the reactor (2) to be closed in order to vacuumize the facility. The process parameters are monitored using various sensors, some of which are connected to an acquisition system and a computer: a volume flow meter (ball rotameter (F1)) placed at the outlet of the ozoniser for adjusting the supply gas flow rates to the reactor (2), a mass flow meter (F2) to precisely measure the supply flow rate to the reactor (2), an ozone analyser (A1) for measuring the ozone concentration of the supply gas to the reactor (2), two pressure sensors (P1) and (P2) for measuring the pressure upstream and downstream of the reactor (2), and a temperature probe (T1) for measuring the temperature within the reactor (2).

The synthesis of the material of interest is carried out by direct gas/solid reaction between cyclodextrins (CDs) and a gas mixture containing ozone ($O_3$). Cyclodextrins (CDs) used in the experimental section in connection with this facility are α-cyclodextrin (α-CD, supplied by Sigma-Aldrich, manufactured by Wacker Chemie AG, Burghausen, Germany, Life Science, batch BCBQ5117V, 98% pure), β-cyclodextrin (β-CD, supplied by Sigma-Aldrich, manufactured by Wacker Chemie AG, Burghausen, Germany, Life Science, batch BCBG7824V, 98.6% pure), γ-cyclodextrin (γ-CD, supplied by Sigma-Aldrich, manufactured by Wacker Chemie AG, Burghausen, Germany, Life Science, batch BCBG7825, 99.5% pure), (2-hydroxypropyl)-β-cyclodextrin (HP-β-CD, supplied by Sigma-Aldrich, manufactured by Wacker Chemie AG, Burghausen, Germany, batches BCBV0722 and BCBX5180, more than 94% pure), Sulfobutylether-β-Cyclodextrin (SBE-β-CD, supplied by ABMole, batches M4837-07, 98.08% pure) and a cyclodextrin polymer (β-CD polymer, supplied by Sigma-Aldrich, product number C2485, batch BCBX7555).

The reactor (2) used is entirely of stainless steel. It is a tubular reactor with a diameter of 17 mm, a total length of 150 mm and a working length of 50 mm, which can hold up to about 5 g of cyclodextrin powder. It has a double stainless steel jacket in which a heat transfer fluid circulates through flexible pipes. These pipes are connected to the thermostatic bath (3), which ensures temperature setting and circulation of the heat transfer fluid in the double jacket of the reactor. The reactor is mounted in a vertical position, with a gas supply at the bottom, and is connected to the rest of the process by stainless steel double ring fittings.

The material before reaction, consisting of native cyclodextrins, is initially fed into the reactor (2) manually. The solid in powder form is held in the reactor via two sintered parts positioned upstream and downstream of the powder.

The vacuum pump (4) allows the reactor and part of the facility to be vacuumized when necessary.

The filter (5) avoid fine particles being entrained into the scavenger.

The ozone scavenger (6) is a thermo-catalytic scavenger. On contact with the catalyst and under the effect of temperature, the ozone molecules are decomposed into oxygen molecules before being released into the atmosphere (vent).

For the start-up phase, the valves are initially positioned in such a way that the gas leaving the ozone generator is directed to the ozone scavenger via the reactor bypass: valves (V5), (V6) and (V8) closed, and valve (V7) open.

The ozone gas is generated by an ozoniser (1) (model CFS-01-2G from Ozonia). It uses a dielectric discharge process from dry air or oxygen. The ozone production is set directly on the ozoniser by a power value. The gas produced at the outlet of the ozoniser is either an $O_2/O_3$ mixture when pure oxygen is used as the supply gas to the ozoniser, or an $N_2/O_2/O_3$ mixture if air is used instead of pure oxygen. The flow rate of this gas at the outlet of the ozone generator is adjusted and measured using first the rotameter (F1) and then the flow meter (F2). The ozone concentration is measured by means of the analyser (A1).

The power of the ozoniser is increased until the desired ozone concentration in the gas is reached. During this transitional phase, the gas flow does not pass through the reactor. In experiments with this facility, the ozone concentration can be very high, for example 165 g $O_3/Nm^3$.

The temperature in the reactor is controlled by the thermostatic bath (3). The temperature range of the experiments carried out with this facility is between 7 and 77° C.

Once the ozone concentration on the analyser (A1) and the temperature (T1) are stable and in accordance with the desired values, the gas leaving the ozoniser is directed to the reactor by closing valve (V7) and opening valves (V6) and (V8). In the experiments carried out, the gas flow rate can be variable, and varied from 33 to 723 Normal litres per hour (Nl/h) with the flow meters (F1) and (F2). The contacting time of the powder with the ozone-containing gas can also be variable, ranging from 0.5 to 6 h for these experiments.

When the desired reaction time is reached, the valves are positioned so that the gas leaving the ozoniser is directed to the scavenger. The reactor is then taken off from the support and the sintered parts are removed.

The material obtained at the end of the synthesis is a fine powder, resembling, to the naked eye, the material prior to the process according to the invention.

The ozone-treated powder is then recovered and stored in a glass vial or shaped (in the form of a pellet, for example).

II. Characterisation of the Material According to the Present Invention

II.1. Characterisations and Assays

Characterisation tests (thermogravimetric analysis coupled with a differential calorimetric analysis, Infrared spectroscopy . . . ) and assays (potassium iodide/sodium thiosulphate assay—assay method called "KI method" or "KI test"—allowing the amount of ozone contained in the powder to be determined) have been carried out on some of the materials.

Figure 2:
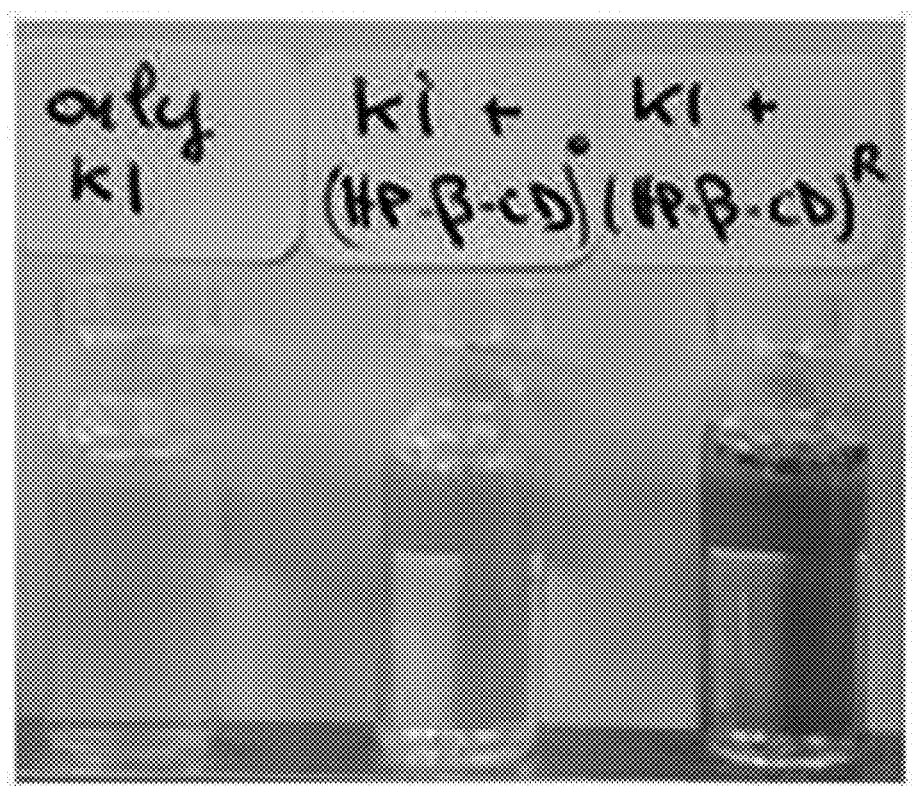
FIG. 2 shows the results of a potassium iodide (KI) test performed with native HP-β-CD before reaction (middle vial=negative test) and after reaction (right vial=positive test), the left vial being a negative control containing only KI. The test was performed immediately after synthesis (at $D_0$).

Note that dissolving native cyclodextrins (commercial product) in a KI solution does not produce any staining of the solution (negative KI test). Only the cyclodextrins reacted with ozone obtained according to the process of the invention have a "positive" KI test: the solution becomes yellow/orange as illustrated in FIG. 2.

II.2. Detailed Protocol for Biological Tests

The purpose of the microbiological tests is to verify the biocidal effect of the material according to the present invention and thus to evaluate its potential for use in crop protection for example.

II.2.1. Protocol A

Artificial supports are first placed in Petri dishes (2 dishes/modality tested) without agar medium and then inoculated with a solution of micro-organisms (fungi or bacteria), for example conidia of *Venturia inaequalis*, the fungus responsible for apple scab. These supports are then placed in an incubation chamber for 24 hours in order to initiate development of the micro-organisms.

Treatments with a material according to the present invention are applied by sprinkling (0.1 g/dish) 24 h after the beginning of germination.

After approximately one hour of contacting the micro-organisms with the material, the artificial supports are moved to an agar medium (Patato Dextrose Agar) in order to ensure the nutrient supply necessary for the proper development of the micro-organisms. The inoculated Petri dishes treated are then placed in an air-conditioned chamber (12 h/12 h day/night cycle, night temperature: 8° C., day temperature: 17° C.).

From the 3rd day of incubation, regular observations and counts are carried out in order to evaluate and compare the different modalities.

II.2.2. Protocol B

Fungal Strains:

Three fungal strains have been tested. Strains 110.712 and 100.398 belong to the species *Pheaoacremonium minimum*. Strain 239.74 corresponds to the species *Phaeomoniella chlamydospora*. They are referred to as *P. min* 110.712, *P. min* 100.398 and *P. ch* 239.74 respectively below. All three are associated with the grapevine wood diseases known as Esca.

They have been first grown for four weeks on agar medium (Malt Extract Agar MEA) to allow them to reach the sporulation stage. On the day of the test, a spore suspension with a concentration of approximately $1.10^5$ spores/mL has been prepared for each strain. Count was carried out on Malassez cells. The spore suspensions thus obtained are distributed in 8 eppendorf tubes (1.5 mL of suspension per eppendorf tube).

The native or ozonated powder and the spore suspensions are contacted for 20 min on ice. The samples are then diluted and seeded on agar medium (MEA). Petri dishes are incubated for 5 days in the dark at 26° C. Counts are carried out after this incubation time and will allow comparison of samples that received native powder without ozone versus those that received ozonated powder.

As soon as they were contacted with the native or ozonated material, 150 µL of spore suspension have been deposited on 96-well plates in order to read absorbance every 10 min for 4 h at 600 nm using the TECAN (150 rpm stirring, 37° C.). The different modalities have then been compared.

II.3. Results

Three series of tests (Test Runs No. 1, No. 2 and No. 3) have been carried out (3 h of reaction at ambient temperature ($T_{am}$) approximately 25° C., with native products used without any prior treatment) in order to evaluate: (i) the effect of the type of cyclodextrins (β-CD and HP-β-CD); (ii) the influence of the storage conditions of the material after reaction ($T_{am}$ or 6° C.); (iii) the amount of ozone contained in the material; (iv) the reproducibility; (iv) the efficiency of the material (biological tests according to protocol A (point II.2.1. above).

Additional tests (Test Run No. 4), have been carried out to make sure that the disinfecting capacities of the oxidising β-CDs that is prepared according to the process of the invention are verified on several bacterial and fungal strains. These tests have been carried out according to protocol B (point II.2.2. above) with oxidising CDs obtained from HP-β-CD according to process example 2 (point I.2. above).

II.3.1. Test run No. 1: β-CD

The syntheses were carried out with the β-CD according to process example 1 (point I.1. above). The batch of powder at the end of the synthesis was divided into two parts: one stored under ambient conditions and one at 6° C. The analytical characterisations of the product formed were carried out 48 h after the end of the synthesis ($D_0+2$) at the time of the biological tests (Bio Tests). The results are summarised in Table 1 below.

TABLE 1

Summary of tests No1

| Exp | Sample | Storage T | KI Test | $[O_3]$ µg/$g_{powder}$ | $m_{powder}$ Bio test | Pathogens | Biological efficiency |
|---|---|---|---|---|---|---|---|
| 1 | 1 | $T_{am}$ | — |  | 0.1 g | Bacteria + fungi | Partial (growth slowdown) |
| 1 | 2 | 6° C. | — |  | 0.1 g | Bacteria + fungi | |
| 2 | 3 | $T_{am}$ | Positive | 725(*) | 0.1 g | Bacteria + fungi | |
| 2 | 4 | 6° C. | Positive | 817(*) | 0.1 g | Bacteria + fungi | |

BIO TESTS (*)

(*) done at $D_0 + 2$

Bacterial Strains:

Two species have been tested: *Escherichia coli* and *Streptococcus uberis* (*E. coli* and *S. uberis*). The bacteria, which had previously been stored in glycerol milk at −80° C., have been deposited in a liquid BHB (Brain Heart Broth) medium, previously autoclaved for 15 min at 121° C.

In order to bring them out of the latent phase and allow them to reach the exponential growth phase, the bacteria have been pre-cultured for 4 h and 4 h30 respectively at 37° C. under 150 rpm stirring.

Figure 3:
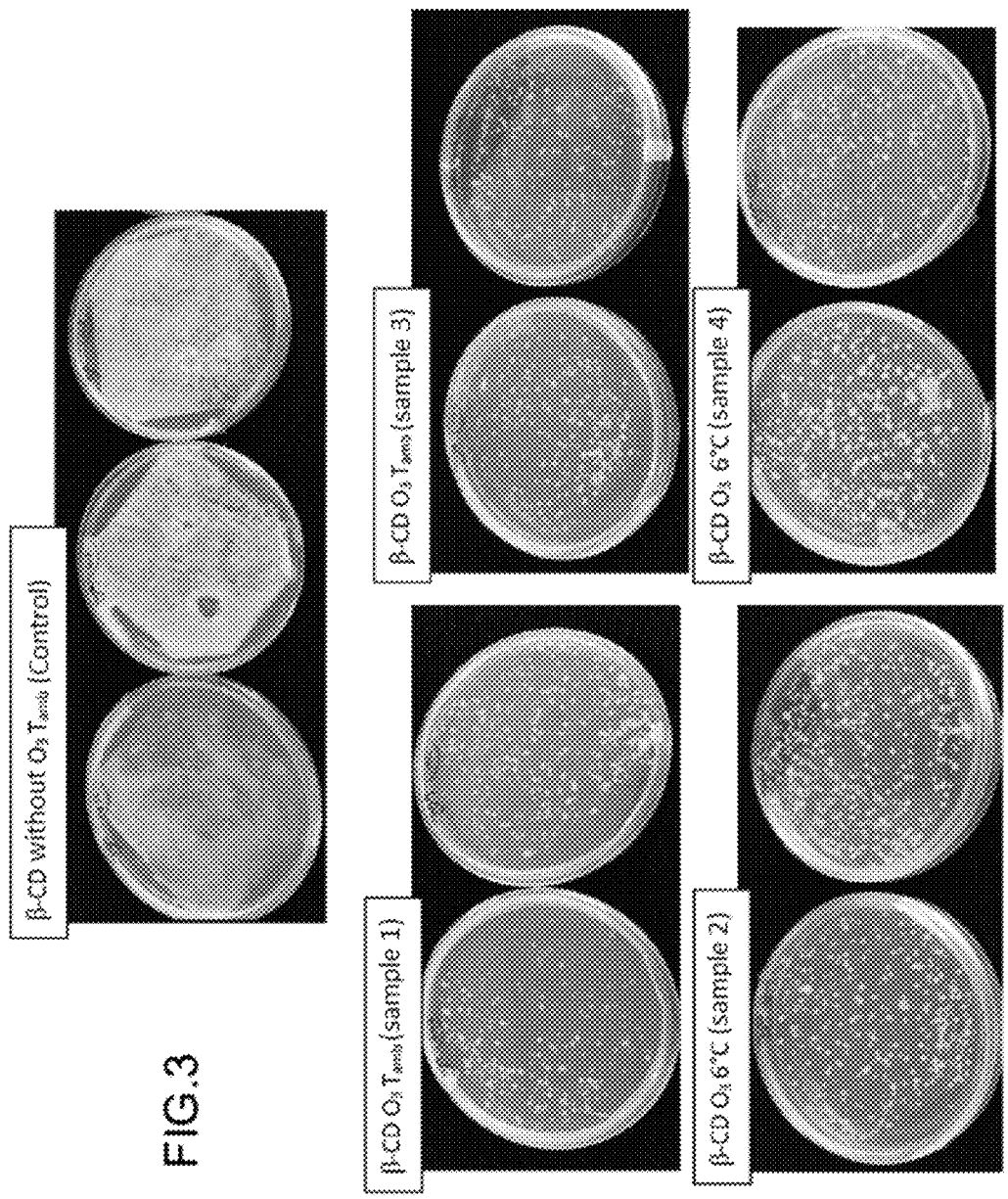
FIG. 3 shows the results of biological tests under the conditions detailed in Table 1.

The results of biological tests are also set forth in FIG. 3. The control dishes show an uncountable number of micro-organisms (carpet-like appearance). On the other hand, the dishes that received oxidising β-CDs, that is prepared according to the process of the invention, are in turn much more sparse. The effect is therefore proven, even if it is only partial, as not all the micro-organisms could be constrained.

II.3.2. Test Run No. 2: HP-β-CD

The syntheses have been carried out with HP-β-CD according to example 1 of the process (point I.1. above). The batch of powder at the end of the synthesis was divided into two parts: one stored at ambient conditions (about 25° C.) and one at 6° C. Analytical characterisations of the product formed were made 24 h after the end of the synthesis ($D_0+1$) at the time of the biological tests (Bio Tests). The results are summarised in Table 2 hereinafter.

TABLE 2

Summary of tests No2

| Exp | Sample | Storage T | KI test | $[O_3]$ µg/$g_{powder}$ | $m_{powder}$ Bio test | Pathogens | Biological efficiency |
|---|---|---|---|---|---|---|---|
| 3 | 5 | $T_{am}$ | — | | 0.1 g | Bacteria + fungi | Total |
| 3 | 6 | 6° C. | — | | 0.1 g | Bacteria + fungi | Total |
| 4 | 7 | 6° C. | Positive | 5716(*) | 0.1 g | Bacteria + fungi | Total |

(*) done at $D_0 + 2$

Figure 4:
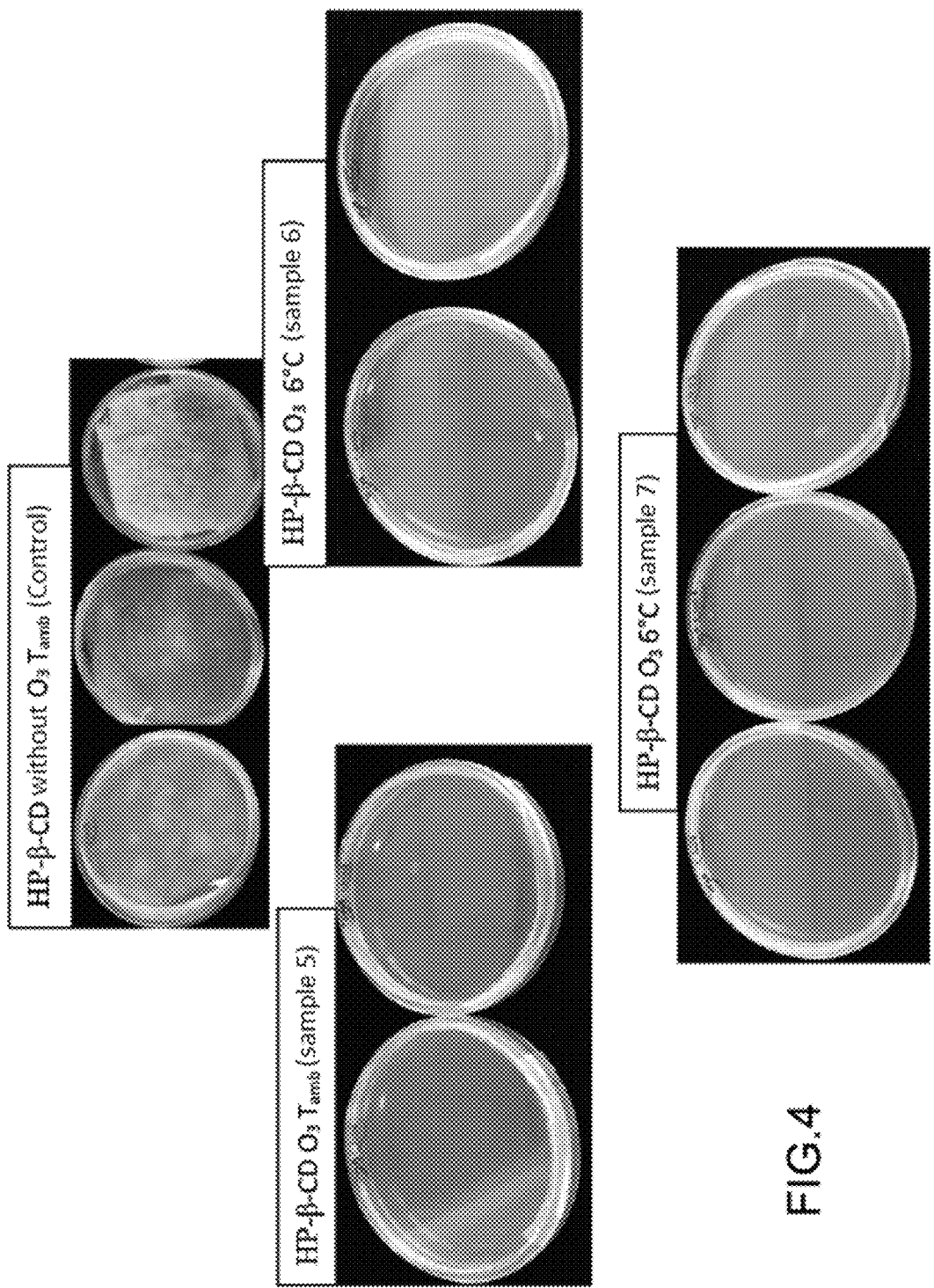
FIG. 4 shows the results of biological tests under the conditions detailed in Table 2.

The results of biological tests are also set forth in FIG. 4. The control dishes again show an uncountable number of micro-organisms. On the other hand, no micro-organisms at this stage, that is at $D_0+1$, are visible on the dishes that have been treated with oxidising HP-β-CDs, that is prepared according to the process of the invention.

II.3.3. Test Run No. 3: HP-β-CD

The syntheses have been carried out with HP-β-CD according to process example 1 (point I.1. above). The batch of powder at the end of the synthesis was kept in its entirety under ambient conditions. Ozone assay in the material has been carried out immediately after synthesis ($D_0$), 24 h after synthesis ($D_0+1$) and 48 h after synthesis ($D_0+2$). The results are summarised in Table 3 hereinafter.

TABLE 3

Summary of tests No3

| Exp | Sample | Date | KI test | $[O_3]$ µg/$g_{powder}$ | $m_{powder}$ Bio test | Pathogens | Biological efficiency |
|---|---|---|---|---|---|---|---|
| 5 | 8_0 | $D_0$ | Positive | 5700 +− 100 (*) | 0.05 g | fungi | Total |
| | 8_1 | $D_0 + 1$ | Positive | 4713 (**) | — | — | — |
| | 8_2 | $D_0 + 2$ | Positive | 3743(**) | — | — | — |

(*) mean value and uncertainty obtained with 3 assays

The values indicated (**) are those obtained on the first decolourising of the solution. It can be seen that the solution gradually recolourises yellow again after the end of the assay. The indicated value is therefore probably underestimated if recolouring is due to a gradual release of stabilised ozone into the liquid phase. Organised structures in the solution are clearly visible under the microscope: it is possible that cyclodextrins in solution stabilise some ozone, which hence does not react immediately during the assay.

II.3.4. Test Run No. 4

Synthesis of the Materials According to the Invention:

The syntheses have been carried out with α-cyclodextrin (α-CD), β-cyclodextrin (β-CD), γ-cyclodextrin (γ-CD), (2-hydroxypropyl)-β-cyclodextrin (HP-β-CD), Sulfobutyle-ther-β-Cyclodextrin (SBE-β-CD) and a cyclodextrin polymer (β-CD polymer) according to process example 2 (point I.2. above).

The operating conditions for these tests are summarised in Table 4 below. Notations are: Tr (reactor temperature); $[O_3]g$ supply: ozone concentration in the supply gas; Q=gas flow rate; $t_s$=synthesis time; m=mass of powder introduced into the reactor; $[O_3]_p$=amount of stored ozone obtained by KI volumetric assay; Pre-treatment: pre-treatment of the powder before reaction; Ozoniser supply=nature of the supply gas to the ozoniser.

TABLE 4

Operating conditions of syntheses during tests No4

| Tr | | $[O3]_g$ supply | | Q | | $t_s$ | m | $[O3]_P$ | $\Delta_{[O3]P}$ | Product | Pre-treatment | Ozoniser supply |
|---|---|---|---|---|---|---|---|---|---|---|---|---|
| Mean °C. | σ | Mean g/Nm³ | σ | Mean Nl/h | σ | h | g | $Mg_{O3}/g_{product}$ | | / | / | / |
| 25.6 | 0.2 | 77 | 1 | 185 | 3 | 2 | 1.05 | 1.47 | 0.17 | α-CD | none | O2 |
| 25.1 | 0.3 | 76 | 5 | 186 | 5 | 2 | 1.07 | 0.99 | 0.15 | β-CD | none | O2 |
| 25.4 | 0.1 | 76 | 1 | 186 | 7 | 2 | 1.05 | 5.71 | 0.31 | HP-β-CD | none | O2 |
| 25.7 | 0.1 | 77 | 1 | 185 | 3 | 2 | 1.02 | 0.26 | 0.13 | SBE-β-CD | none | O2 |
| 25.3 | 0.1 | 78 | 1 | 182 | 4 | 2 | 1.02 | 5.44 | 0.31 | β-CD-Polymer | none | O2 |
| 25.1 | 0.1 | 77 | 1 | 188 | 3 | 2 | 1.01 | 0.91 | 0.15 | γ-CD | none | O2 |

Under identical operating conditions, it is noted that the ozone storage capacity is strongly dependent on the nature of the CD used for the synthesis, the best results being obtained with HP-β-CD and the β-CD polymer.

Evaluation of the Biocidal Character of a Material Thus Prepared on Several Bacterial and Fungal Strains The results are summarised in Table 5 below.

TABLE 5

Biocidal character of the material according to the invention

| Pathogens | | Biological efficacy |
|---|---|---|
| Fungi | P.min 110.712 | Confirmed |
| | P.min 100.398 | (spores unable to grow |
| | P.ch 239.74 | after 5 days incubation) |
| Bacteria | E.coli | Confirmed |
| | S.uberis | (Growth arrest) |

Concerning the fungal strains, the control dishes exhibit an uncountable number of micro-organisms (carpet-like appearance). On the other hand, dishes that received oxidising β-CDs, that are prepared according to the process of the invention, are largely sparser or completely free of mycelial spots. At 100-fold dilution, the control agar media still contain numerous mycelial starts (on average 990/ml deposited) whereas the agar media that have received oxidising β-CDs, that are prepared according to the process of the invention, no longer contain any for the strains P. min 100.398 and P. ch. 239.74. Only a few mycelial starts are visible for the strain P. min 110.712, which seems to be a little less sensitive. The fungicidal effect is therefore confirmed.

As far as the bacterial strains are concerned, the addition of oxidising β-CDs, that are prepared according to the process of the invention, stops development of the bacteria in both cases, whereas the controls continue growing during the hours of analysis. Again, it can be concluded that the newly obtained material has a bactericidal effect.

II.3.5. Stability of the Material According to the Present Invention

In order to test the stability of the material according to the present invention, a synthesis has been carried out with β-CD and a contacting time with ozone of 2 h (according to process example 1 of point I.1. above). The batch of powder at the end of the synthesis has been stored at 6° C. (open vial).

Figure 5:
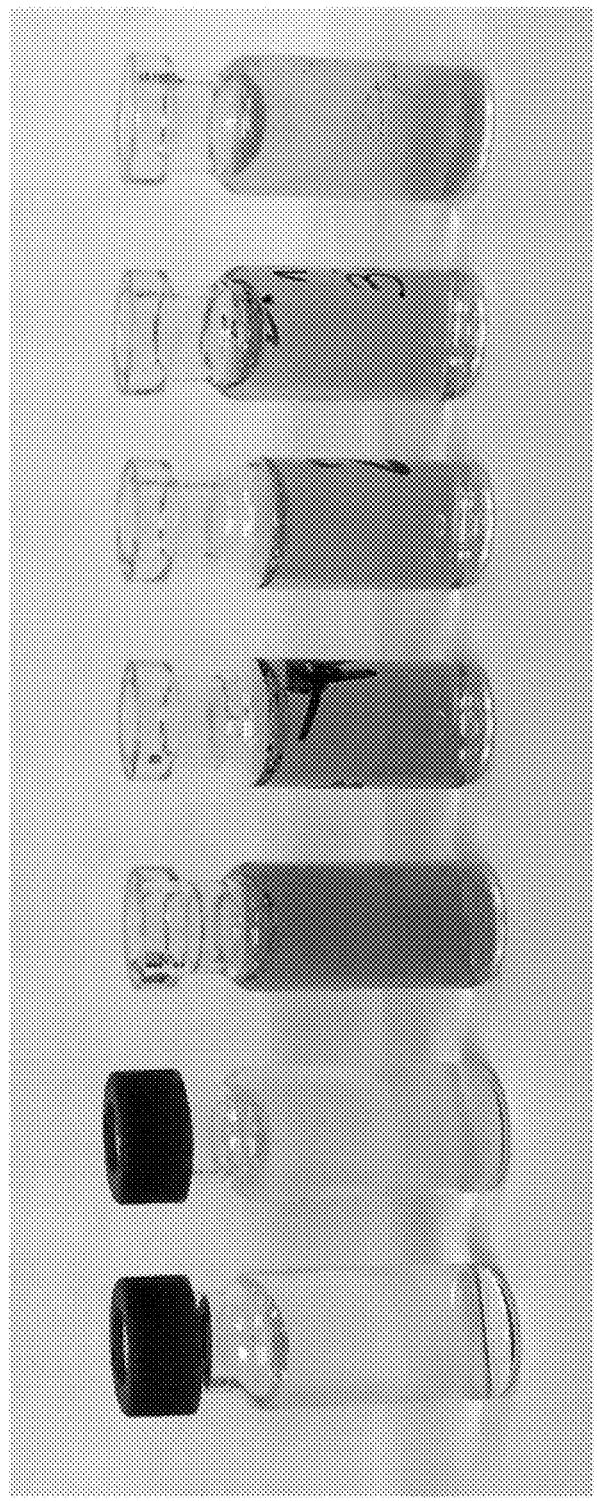
FIG. 5 shows the results of a potassium iodide (KI) test as a function of the storage time of β-CD after reaction. From left to right: KI alone (negative control), KI+native β-CD before reaction, KI+β-CD after reaction at $t_0$, KI+β-CD after reaction at $t_0$+1 day, KI+β-CD after reaction at $t_0$+2 days, KI+β-CD after reaction at $t_0$+5 days and KI+β-CD after reaction at $t_0$+6 days.

FIG. 5 sets forth a series of KI tests performed on the powder at different storage times (1 day, 2 days, 5 days and 6 days). A yellow colour can be seen for all samples containing β-CD subjected to the process according to the invention, to be compared with the transparent colour of KI alone (left-hand vial) or KI with β-CD before the reaction (second vial from the left).

This stability test has been repeated with the ozone-treated HP-β-CD according to process example 2 (section I.2. below) under the following conditions: synthesis time=6 h; ozone concentration in supply gas=69±18 $g_{O3}/Nm^3$; gas flow rate=335 ±7 Nl/h; reactor temperature=27.1° C.±0.5° C. The material was packaged in closed glass vials. The stability of the material has been evaluated over a period of 65 days under different temperature conditions: under ambient conditions at a mean temperature of 21° C.±2° C.; in a refrigerator at a mean temperature of 2° C.±2° C., and in a freezer at a mean temperature of −19° C.±2° C. The ozone concentration in the material has been evaluated by volumetric assay ("KI method").

Figure 6:
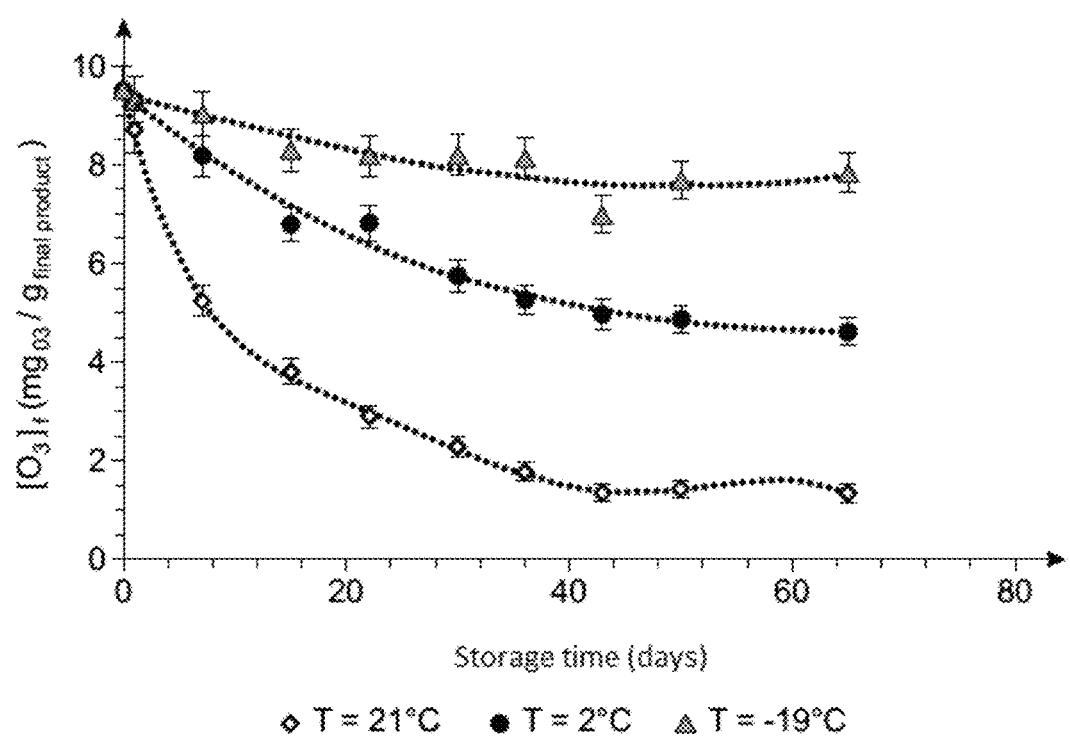
FIG. 6 shows the course of the ozone mass concentration in the material over time for 3 tested storage temperatures (−19° C., 2° C. and 21° C.).

The results of the course of ozone mass concentration in the material over time for the 3 storage temperatures tested (−19° C., 2° C. and 21° C.) are set forth in FIG. 6.

It can therefore be concluded that the material prepared according to the present invention stabilises ozone, thus keeping its oxidative properties at a minimum for several weeks. It should be noted that the lower the storage temperature, the more stable the material. For example, the ozone mass loss rate (calculated as $100×[1−(C/C_0)]$, where C is the ozone mass concentration at time t and $C_0$ is the initial ozone mass concentration) is less than 20% after 65 days of storage if the material is kept at a temperature of −19° C.

In further tests with HP-β-CD stored at ambient temperature for 33 days, it has also been shown that the stability of the material over time was not affected by either primary vacuum conditioning or conditioning under 3.5±0.2 bar absolute $CO_2$.

II.3.6. Ozone Storage By the Material According to the Present Invention

In order to validate ozone storage in the material according to the invention, two tests have been carried out with HP-β-CD treated according to process example 2 (point I.2. above).

First Test:

In the first test, about 1.5 g of ozone storage material in powder form have been placed in a glass cup, which in turn has been placed in a glass reactor of volume 1.4 litres. The reactor can be hermetically closed and has been maintained at ambient temperature (~20° C.).

A portable ozone detector (model X-an-5000 from Dräger, equipped with an XXS $O_3$ cell specifically for ozone detection, detection limit equal to 0.02 ppm and resolution equal to 0.01 ppm, response time <10 s at 20° C.) has been introduced into the reactor and switched on near the powder cup. The detector thus placed makes it possible to continuously emphasise the presence of ozone in the reactor, from an ozone concentration higher than the detection limit of 0.02 ppm.

Firstly, it has been noted that the detector indicates zero ppm of ozone when the powder is left as is (that is the detector is switched on next to the powder for several minutes and does not detect any ozone).

Secondly, using a graduated glass pipette, a volume of approximately 3 ml of distilled water has been introduced onto the powder through one of the upper openings of the reactor. The reactor has then been immediately hermetically closed again to monitor the course of the vapour phase composition of the reactor with the detector over time. The dissolution of part of the material (about ⅓ of the initial amount) by this addition of water (as the material is relatively soluble in water), caused a rapid increase in the ozone concentration over time as read on the detector (for example 0.1 ppm measured in 40 s; 0.2 ppm in 100 s). The maximum concentration reached was 0.48 ppm ozone for this experiment (well above the detection limit of the measurement device).

In another experiment performed under exactly the same conditions, no ozone release was observed on the detector when native product (that is non-ozonated HP-β-CD) has been used. These experiments therefore confirm that the material manufactured according to the present invention does store ozone, and that ozone in gaseous form is released when the material is contacted with water.

Second Test:

In the second test, approximately 2 g of ozone storage material in powder form have been placed in a glass cup, which was in turn placed in a glass reactor of volume 1.7 litre. The hermetically closed reactor has been placed in a stove initially at ambient temperature.

A portable ozone detector (Micro IV model from GIG, calibrated specifically for ozone, detection limit equal to 1 ppm and resolution equal to 0.01 ppm, response time <60 s) has been introduced into the reactor and switched on near the powder cup. The detector thus placed makes it possible to continuously detect the presence of ozone in the reactor, from an ozone concentration higher than the detection limit of 0.01 ppm. Firstly, it has been noted that the detector indicates zero ppm of ozone when the powder is still at ambient temperature.

Secondly, the temperature of the stove is gradually increased (in about one hour) until it reaches 40° C. The purpose of this increase is to facilitate degassing. The course of the vapour phase composition of the reactor is monitored with the detector over time.

At ambient temperature, the detector displayed 0 ppm. On the other hand, the increase in temperature caused an increase in the ozone concentration over time as read on the detector (example: 0.12 ppm measured in 1.5 hours). These experiments therefore confirm that the material manufactured according to the present invention does store ozone, and that ozone in gaseous form is released when the material is subjected to a temperature higher than the ambient temperature.

Conclusion:

These two tests show that the material manufactured according to the present invention does store ozone, and allows the release of ozone gas when this material is dissolved in part in a solvent (in water in the first test), and/or is put under thermodynamic conditions (here a temperature of 40° C. under 1 bar, in the second test) unfavourable to the ozone storage, making the ozone less stable in the material and thus allowing in these conditions the release of a measurable amount of $O_3$ in the given time.

II.4. Conclusions

Contacting ozone with cyclodextrins such as β-CD and HP-β-CD in the solid phase leads to a material with strong oxidative properties. The syntheses as well as the results obtained (assays, biological efficiency, etc) are reproducible. The product obtained at the end of the synthesis is a fine powder that can easily be used for the targeted applications (see biological tests).

Hypothesising that ozone molecules are encapsulated within the material, the ozone concentrations obtained by assay are very high (100 to 1000 times those obtained with ozonated water). This concentration depends on several parameters, including the nature and properties of the CD.

The storage capacity of the material is highly dependent on the CD used as raw material. The best results have been obtained with HP-β-CD (a modified β-CD much more soluble in aqueous phase than simple β-CD) for which an ozone concentration equal to 5700±100 µg/g powder (three assays performed) has been found with process example 1 and 11540±540 g/g powder (three assays performed) with process example 2 (point I.2. above). These values are equivalent to a concentration about 400 and 800 times higher than for ozonated water at ambient temperature and pressure ([$O_3$] ozonated water, 25° C., 1 bar, at 60-80 g/Nm³ (pH=7) about 14 mg/L water), respectively.

It has also been shown that the material maintains its oxidative properties for several months, even with rudimentary storage under ambient conditions (temperature of about 21° C. under air). Nevertheless, the ozone concentration in the material stored under ambient conditions (temperature of about 25-30° C. and synthesis process example 1) decreases over time: the estimated loss is about 20% per day as regards the "immediate" assay of the powder (first decolourising of the KI solution). Measurements carried out with powders synthesized with process example 2 and stored at different temperatures show that low storage temperatures (2° C., –19° C.) allow ozone loss to be limited over time, the best results being obtained with the lowest storage temperature tested (that is –19° C.).

Furthermore, the assay results could also suggest that the solid, once dissolved in water, stabilises some of the ozone, initially contained in the material, within the liquid solution which gradually recolours over time. Predicted concentrations and kinetics could thus be underestimated as compared to reality.

REFERENCES

[1] McTurk & Waller, 1964, "Ozone carbon tetrachloride double hydrate", Nature, vol. 202, page 1107.

[2] Nakagima et al, 2012, "Molecular storage of ozone in a clathrate hydrate: an attempt for preserving ozone at high concentrations", PlosOne, vol. 7: e48563.

[3] Patent application JP 2007/210881 on behalf of Kurita Water Ind. Ltd, published on 23 Aug. 2007.

[4] Dettmer et al, 2017, "Stabilization and prolonged reactivity of aqueous phase ozone with cyclodextrin", Journal of Contaminant Hydrology, vol. 196, pages 1-9.

[5] Patent application US 2018/0178263 on behalf of OXYTEC LLC, published on 28 Jun. 2018.

[6] Patent application US 2016/0367967 on behalf of Temple University of the Commonwealth System of Higher Education, published on 22 Dec. 2016.

[7] International application WO 2006/134299 on behalf of Université de Franche-Comté, published on 21 Dec. 2006.

The invention claimed is:

1. A process for preparing a solid ozone storage material comprising contacting cyclodextrins and/or cyclodextrin derivatives in solid form with a gas comprising ozone, whereby a solid ozone storage material is obtained,
    wherein said cyclodextrin derivative is a chemically modified, cross-linked, immobilized cyclodextrin and/or organized in a molecular superstructure,
    wherein a chemically modified cyclodextrin is a cyclodextrin of which at least one hydrogen atom and/or at least one hydroxyl radical is substituted with an atom or chemical group selected from a halogen atom, an alkyl group, a hydroxyalkyl group, a thioalkyl group, a sulfhydryl group, an acetyl group, a silyl group, an acyl group, a sulphonyl group, an amine group, a sulphoalkylether group, a sulphate group, a phosphate group, a carboxyl group, a carboxylester group, a quaternary ammonium group, a glucosyl group, a maltosyl group or a chlorotriazinyl group, and
    wherein, when contacted with the gas comprising ozone, the cyclodextrins and/or cyclodextrin derivatives are free of any molecule different from a water molecule and capable of reacting with ozone.

2. The process of claim 1, characterised in that said cyclodextrins and/or said cyclodextrin derivatives are selected from the group consisting of α-CDs, β-CDs, γ-CDs, hydroxypropylated α-CDs, hydroxypropylated β-CDs, hydroxypropylated γ-CDs, dimethylated α-CDs, dimethylated β-CDs, dimethylated γ-CDs; sulfobutylether α-CDs, sulfobutylether-β-CDs, sulfobutylether γ-CDs, sulfated α-CDs, sulfated β-CDs, sulfated γ-CDs, phosphated α-CDs, phosphated β-CDs, phosphated γ-CDs; carboxymethylated α-CDs, carboxymethylated β-CDs, carboxymethylated γ-CDs, carboxymethylether α-CDs, carboxymethylether β-CDs, carboxymethylether γ-CDs, 3-trimethylammonium-2-hydroxypropyl-ether α-CDs; 3-trimethylammonium-2-hydroxypropyl-ether β-CDs; 3-trimethylammonium-2-hydroxypropyl-ether γ-CDs; cross-linked cyclodextrin derivatives and mixtures thereof.

3. The process of claim 1, characterised in that said process has a step prior to contacting said cyclodextrins and/or said cyclodextrin derivatives with said gas comprising ozone aiming at either removing all or part of water molecules present in cavities of said cyclodextrins and/or said cyclodextrin derivatives, or replacing all or part of water molecules present in the cavities of the cyclodextrins and/or cyclodextrin derivatives with a non-ozone reactive substance.

4. The process of claim 1, characterised in that said gas comprising ozone is a gas mixture comprising ozone and at least one other gas such as dioxygen, carbon dioxide, nitrogen or a mixture thereof.

5. The process of claim 1, characterised in that contacting between said cyclodextrins and/or said cyclodextrin derivatives and said gas comprising ozone is carried out at a temperature between 0° C. and 80° C.

6. The process of claim 1, characterised in that contacting between said cyclodextrins and/or said cyclodextrin derivatives and said gas comprising ozone lasts between 1 min and 8 h.

* * * * *